United States Patent [19]

Daniel

[11] 4,349,838
[45] Sep. 14, 1982

[54] LASER TARGET DESIGNATOR SYSTEM

[75] Inventor: Jean P. Daniel, Paris, France

[73] Assignee: Thomson-CSF, Paris, France

[21] Appl. No.: 229,261

[22] Filed: Jan. 28, 1981

[30] Foreign Application Priority Data

Feb. 1, 1980 [FR] France ................................ 80 02250

[51] Int. Cl.³ ............................................. H04N 7/18
[52] U.S. Cl. ..................................... 358/125; 33/286;
244/3.13; 244/3.16; 250/203 CT; 250/215;
356/152; 356/153
[58] Field of Search ............... 358/125, 126; 244/3.13,
244/3.16; 250/203 CT, 215; 356/141, 152, 153;
33/286

[56] References Cited

U.S. PATENT DOCUMENTS 4,155,096  5/1979  Thomas ................................ 358/125

Primary Examiner—Howard Britton
Attorney, Agent, or Firm—Cushman, Darby & Cushman

[57] ABSTRACT

The system makes it possible to accurately align the laser emission axis with that of the video image sensor by using a point light source and an associated focusing optical system. External reception is interrupted during the alignment phase. The system tracker measures the errors at X and Y of the image of the source formed on the sensor. The latter is rotated to occupy a plurality of predetermined successive angular positions. An electronic control and calculating system supplies, on the basis of successive error data, sweep correction signals at X and Y making it possible to control the center of the image coinciding then with the invariable point of the image corresponding to the rotation axis.

6 Claims, 5 Drawing Figures

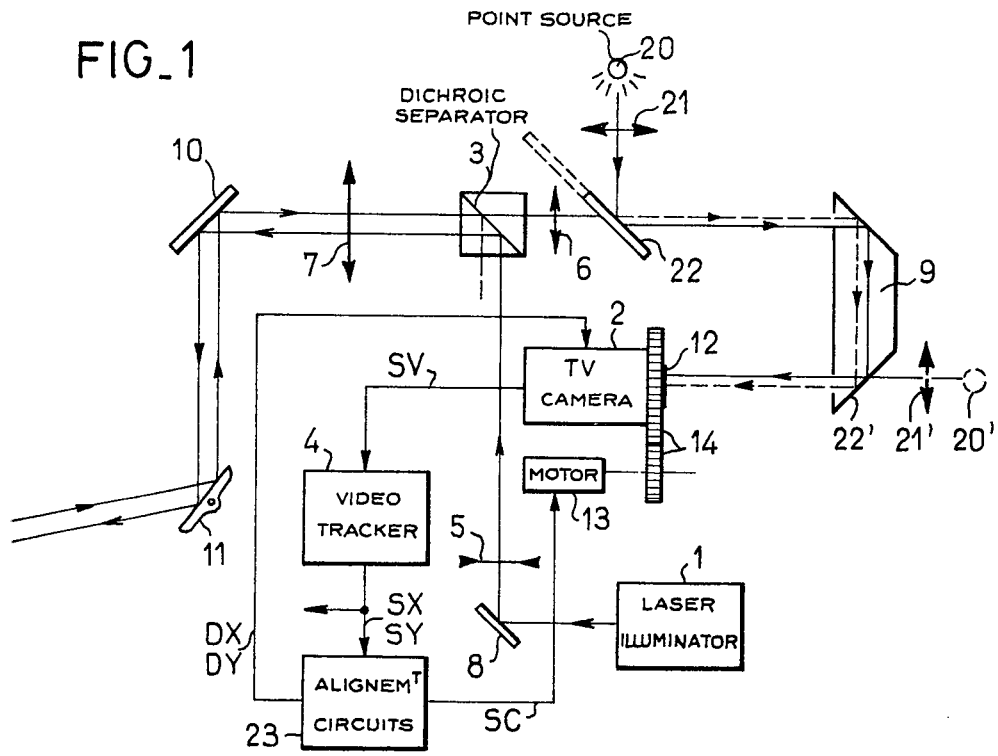
FIG_1
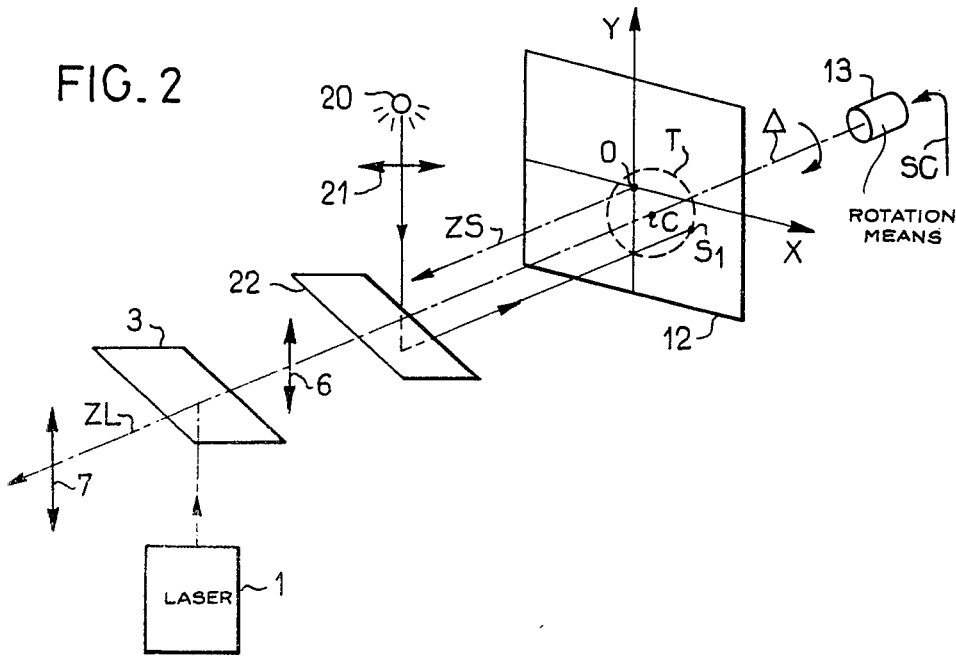
FIG_2

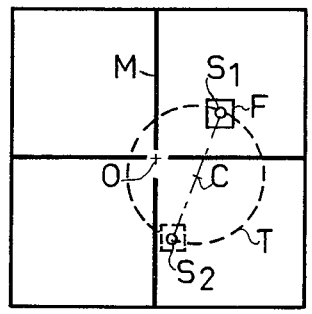
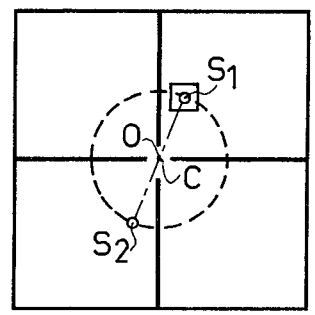
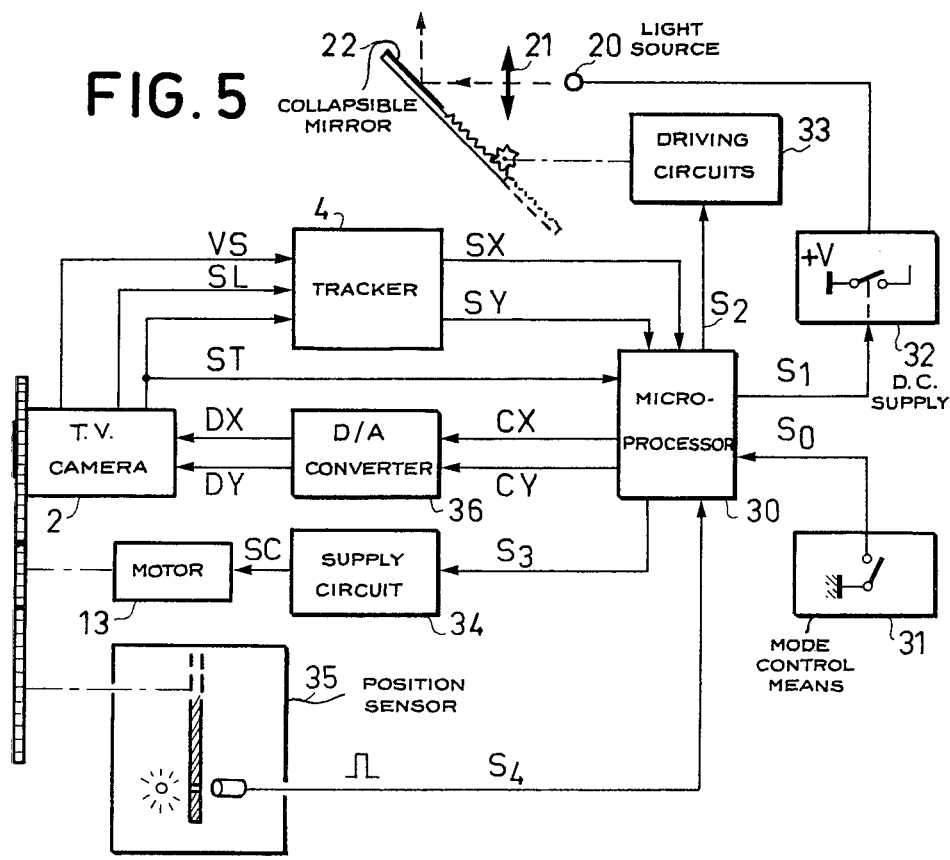

FIG. 5 an operational diagram of a possible embodiment of the alignment device according to the invention.

DETAILED DESCRIPTION OF THE PREFERRED EMBODIMENTS

In simplified manner, FIG. 1 shows a typical arrangement of a laser target designator system with an illuminator laser 1, a video image sensor 2 such as a television camera, a dichroic separator 3 for reflecting the laser radiation and for transmitting to the sensor the radiation from the observed field and a video processing circuit 4, called a tracker and forming part of the video tracking chain. In addition to the aforementioned components, there are the optical components inserted in the transmission and reception channels and which, in the represented manner, can comprise lenses 5, 6, 7 and deviating prisms or mirrors 8, 9, 10 and 11. Assembly 6–7 constitutes the focusing optics for the radiation received from the outside on the photosensitive surface 12 of sensor 2. Mirror 11 forms the stabilized, orientable mirror for varying the common sighting and illumination direction of the system, the stabilization and orientation means not being shown in order to facilitate the understanding of the drawing. It is also assumed that the sensor rotates in such a way as to eliminate image rotation caused by roll. The rotation means are symbolized by a motor 13 and a set of pinions 14.

In order that this system can constitute the alignment device, it comprises a small light source 20, such as a light-emitting diode, whose radiation is compatible with the reception wavelength band of the sensor, an optical system 21 for focusing this radiation onto the photosensitive surface 12 or image plane and an optical means for receiving said radiation in the sighting field of the sensor. This optical means can comprise the collapsible deviating mirror 22 interposed on the reception path during the alignment. Block 23 symbolizes the electronic alignment means making it possible on the one hand to control by means of a signal SC motor 13 and angularly position the sensor and on the other to calculate the correction signals DX, DY intended for the sensor for the purpose of modifying the position of the swept image centre corresponding to the sighting field axis. The correction signals DX, DY are processed on the basis of error or deviation data SX, SY from source 20 supplied by tracker 4.

FIG. 2 more clearly shows the alignment to be made between the laser axis ZL and the sensor axis ZS. Axis ZL is the axis of the laser beam after reflection on dichroic separator 3. This direction leads to point C of the image plane 12. Axis ZS of the sensor sighting field has the same direction and corresponds to the centre point O of the swept image on surface 12. Alignment consists of making the two points C and O coincide. Axis Δ is the rotation axis of the sensor, its direction being orthogonal to the image plane 12, like that of axes ZL and ZS. It is assumed that the laser axis ZL is aligned beforehand with rotation axis Δ in accordance with a routine mechanical or opto-mechanical regulating procedure in accordance with prior art methods. This alignment is stable and need not be repeated for each mission. It is therefore agreed that, except for setting errors, axes ZL and Δ coincide and pass through the same point C of the image plane. Thus, the alignment which then has to be carried out consists of bringing the sweep centre O to C, i.e. cancelling out the errors CX and CY of point C with respect to the error measurement reference axes X and Y passing through O. The radiation of source 20 is focused at a point S1 of photosensitive surface 12. By rotating the sensor about its rotation axis Δ, the light spot S1 imaging source 20 describes a circle T centred at point C constituting the invariable point of the image. The radius of the circle is a function of the positioning of source 12. By means of circuits 4 and 23, the alignment device makes it possible to constitute an automatic feedback loop between rotation axis Δ and the sensor sweep circuits in which the errors SX, SY obtained from video signal SV are processed for the purpose of detecting and measuring the errors CX, CY between the centre O of the sensor sighting field and the invariable point of image C and for converting these errors into signals DX, DY directly usable for adjusting the sweep of the sensor and for making centre O coincide with point C. Thus, the feedback loop makes it possible to very accurately align the sighting axis ZS of the sensor in the rotation axis Δ and consequently with the laser axis ZL.

In order to calculate the errors CX, CY of the invariable point C with respect to the scanning centre O, it is necessary to know several points, such as S1, of circle T on which S1 moves during rotation, so as to be able to define circle T and correlatively its centre C. Therefore, the control SC of the rotation is produced for obtaining several different predetermined successive positions of S1 on the image plane. The simplest operating mode, which is also preferred because it gives rise to simple calculations, consists of producing a single 180° rotation in the manner shown in FIG. 3. Thus, the image point of source 20 occupies the initial position S1 then, after rotation, the diametrically opposite position S2. The coordinates of centre C are then given by the half-sum $(x1+x2)/2$ and $(y1+y2)/2$ of the coordinates of points S1 $(x1, y1)$ and S2 $(x2, y2)$ supplied by tracker 4. FIG. 4 shows the same configuration following the action of the feedback loop, which cancels out the errors between O and C. The electronic window F serves to designate in known manner the light spot, whose errors at X and Y are to be measured. These errors correspond to the centre of the window. An electronic test pattern M makes it possible to define the centre of the image and to represent the error measurement reference axes.

FIG. 8 illustrates in the form of a conventional diagram an embodiment of the alignment device and more particularly the electronic alignment means 23 of FIG. 1. A special computer 30, such as a microcomputer or microprocessor for example, processes the orders and carries out the processing operations during a time sequence corresponding to the alignment operation. Block 31 symbolizes the ancillary control members making it possible for the operator to choose the various operating modes envisaged for the system. There can be a control panel provided with push buttons for selecting the different modes and the alignment function can be produced, for example, by acting on a control by means of a push button provided for this purpose or, by forming a particular combination of several of these controls. No matter what the solution provided, it is assumed that the output SO of the ancillary control circuits of mode 31 has, in particular, a state corresponding to the control of the alignment phase. For this state, signal SO starts a corresponding process in computer 30. This process involves the processing of various control signals, the first control signal S1 serving to supply the light source 20. For example, signal S1 can control a

LASER TARGET DESIGNATOR SYSTEM

BACKGROUND OF THE INVENTION

The present invention relates to systems for designating targets by means of lasers and relates more specifically to a device for the alignment of the axes of the laser and the video image detector, called a sensor.

In such systems, a target is designated by means of a directional light beam obtained by a laser illuminator. The term pod is used to designate the fusiform member or nacelle, positioned externally of the carrying aircraft and which incorporates most of the system.

Advanced systems have automatic video tracking. Following designation of the target by means of the image sensor associated with the tracking device, the pointing of the laser beam on the target is automatically maintained without intervention by the pilot and independently of flight manoeuvres. When mounted in a pod adaptable to different types of apparatus, the system can be operated from a singleseater aircraft and is able to meet tactical requirements, particularly direct, low altitude, high speed attacks. The system makes it possible to guide rockets or missiles, like automatic laser guidance systems.

According to a prior art construction, such a system comprises a range-finder - laser illuminator functioning with coded pulses and with stabilization of the beam which remains pointed on the target by a television camera with automatic tracking. A gyroscope located at the front of the pod stabilizes the line of sight common to the television camera and the laser emission and permits the orientation thereof. The image of the scenery is reflected by a stabilized mirror towards the television camera across an optical path with a variable focal length. The television image is displayed in the cockpit and the video signals are processed by automatic tracking means. The laser illumination is reflected by a dichroic mirror placed in the optical path in such a way that it leaves parallel to the optical line of sight corresponding to the photograph of the scenery taken by the television camera. The stabilized mirror is used for isolating the line of sight from structural vibrations and permits the orientation thereof. Stabilization is produced by a yaw/pitch gyroscopic platform, whilst orientation is brought about by the rotation in roll of the front part synchronized with site and bearing movements of the mirror by a gimbal joint device. The television tracking system functions on two modes, the first serving to stabilize the image on the target area and to designate it and the second for automatic tracking operation. The first mode corresponds to the target acquisition or designation phase and the second can be produced by using the area correlation method or a video contrast analysis process.

One of the problems to be solved for these systems is the precise alignment throughout the designation phase of the axis of the laser emission with that of the sensor sighting field corresponding to the centre of the video image.

An automatic alignment method using the laser source is described in U.S. Pat. No. 4,155,096, which uses retroreflection of the laser radiation. However, this method has the following disadvantages.

The dichroic separator permits the passage of a fraction of the retroreflected laser energy to the image sensor and produces an image of the photosensitive surface thereof. The separator and the optical components positioned along the optical reception path leading to the sensor normally serve to transmit light energy having a wavelength differing from that of the laser and their transmittance at the wavelength of the laser source is often subject to considerable dispersion. It is therefore necessary to provide for these components specific characteristics for adapting to the wavelength of the laser. This also applies to the image sensitive T.V camera, FLIR or the like, which must have sensitivity characteristics at the wavelength of the laser.

Moreover, the laser is generally of the pulsed type, said pulses being supplied at a rate which is below the sweep frequency of the sensor. As a result the system circuits normally timed at the sweep frequency must be able to operate at the laser rate on the basis of video information. This is effective for automatic luminosity or video chain gain circuits and for the tracker.

Another problem occurs in the case where the laser source is coupled to a laser receiver for performing telemetry. The retroreflected laser energy following the dichroic separator essentially passes through the laser path, which represents a real risk for the laser receiver and makes it necessary to protect the latter during alignment.

Another difficulty can result from the constraints concerning the laser safety. Thus, the alignment cannot be performed in time before the target designation phase, because the laser is unusable during a large part of the mission in order to respect the safety regulations.

The object of the invention is to provide a device for the precise alignment of the laser and sensor axes and which does not have the disadvantages referred to hereinbefore. This largely results from the fact that the alignment method used does not employ the laser source. As a result, it is completely free from the indicated problems of the light wavelength, the laser rate, the laser energy return and the laser safety.

BRIEF SUMMARY OF THE INVENTION

According to a feature of the invention, the alignment device uses a light source provided for this purposes and whose radiation is focused on the sensor, the rotation of the sensor for displacing the image point of this source about the invariable point of the image corresponding to the rotation axis, said rotation being produced so as to correspond to different successive, predetermined positions, the measurement of the X and Y errors of the image point for these different positions and the deduction by calculating the errors of the variable point relative to the centre of the image, and the corresponding modifications of the sensor sweep signals at X and Y in order to make the centre of the image coincide with the rotation axis, the laser axis also being aligned with the rotation axis.

BRIEF DESCRIPTION OF THE DRAWINGS

The invention is described in greater detail hereinafter relative to non-limitative embodiments and with reference to the attached drawings, wherein show:

FIG. 1 a general diagram of the main means of a laser target designator system according to the invention.

FIG. 2 a simplified diagram illustrating the alignment problem to be solved and the process used.

FIG. 3 the display of the video image during alignment and when there is an error to be cancelled out.

FIG. 4 the same view as in FIG. 3 following the action of the alignment device.

supply circuit 32 formed by a switch and the switching off thereof connects a continuous power supply +V to the source. A second control signal S2 is intended for a drive circuit 33 for displacing mirror 22 from its inoperative position (indicated by dotted lines) to that which it assumes during alignment. Finally, a third signal S3 is transmitted to a supply circuit 34 for motor 13 for the purpose of rotating camera 2. The movement is stopped when the camera is in a first angular position determined by means of a sensing means 35 which, at this moment, supplies a signal S4 to the computer which stops motor 13 by modifying the state of signal S3. Sensing means 35 can be constructed in various ways, one of them being symbolized by a rotary disk which is synchronous with the camera and carries an optical path, whilst on either side of the path and externally of the disk there are a light-emitting diode and a photoelectric cell. The path may consist solely of two diametrically opposite slots.

When the image point S1 has been designated by the operator by means of window F, the tracker 4 supplies, from video signal SV and line SL and frame ST synchronization signals, error signals SX, SY which express the coordinates x1, y1 of this point. These error values are stored in a memory of computer 30 which then again controls the rotation of the camera up to the second position for collecting the coordinates x2 and y2 at point S2 diametrically opposite to S1. Computer 30 then carries out the calculation of the error data CX, CY of the centre C on the basis of the stored values x1, x2, y1, y2 and transmits the data to a conversion circuit 36 which produces suitable analog correction signals DX, DY intended for the deflection circuits of the camera tube in the camera. Signals DX and DY are mixed there with the deflection signals to produce the desired corrections and move the centre O of the sweep to C. The alignment process is then ended and can be performed again to further improve the setting in accordance with the flow chart described hereinbefore.

Circuits 30 to 36 can easily be realised in the indicated manner or in accordance with various known methods. It should be noted that computer 30 can be designed in the form of a simple microprocessor or, can form part of the computer normally inserted in the automatic video tracking chain of the target designator system.

The position of source 20 and the associated components 21 and 22 must be carried out in such a way that the image point S1 is brought relatively close to centre C, for example in such a way that the radius of circle T does not exceed 10 to 20% of the camera sighting field, so as to remain relatively near to the centre of the image in order to benefit from the linear processing area of the tracker and increase the setting accuracy. In FIGS. 2, 3 and 4 the errors between O and C and the radius of the circle have been deliberately exaggerated in order to clarify the representation. Thus, the positioning of components 20 to 22 only requires a relatively moderate accuracy. In the special case where the image point of the source corresponded with the invariable point C of the image, i.e. the case of the circle of radius O, the operation would remain unchanged and on each occasion the tracker 4 would directly supply errors corresponding to CX and CY.

Among the possible constructional variants, reference is made to the dotted line configuration of FIG. 1 with source 20', optical system 21' and mirror 22'. The latter comprises one of the mirrors of the reception channel, e.g. the last in the shown manner. This mirror is made semi-reflecting in order to permit the passage by transparency of the radiation from source 20' during alignment. This arrangement also obviates the need for a retractable or collapsible mirror 22. However, another development can be made to the structure to prevent the reception of the radiation from the external scene during alignment. One solution consists of orienting mirror 11 in such a way that the sighting direction is no longer outwardly directed across a not shown, transparent dome and is instead directed towards a dark area within the pod.

The alignment procedure described hereinbefore can be used as frequently as necessary, particularly for each operational mission and this can either be automatic or controlled by the operator. The operational elements continue to be used in the normal way, whilst the specific components added for alignment purposes are of a standard nature, with no special manufacturing or fitting characteristics.

In addition to the advantages referred to hereinbefore with respect to the alignment device according to the invention, it is also pointed out that if there is a residual displacement $\delta$ between the laser axis ZL and the rotation axis $\Delta$ after prior mechanical adjustment, this displacement remains constant throughout the rotation, whereas it would vary between 0 2$\delta$ in a prior art system of the type referred to hereinbefore.

What is claimed is:

1. A laser target designator system comprising: a laser illuminator; an electronically swept video image sensor; video tracking means with a tracker processing on the basis of the video signal the error signals at X and Y of the designated target; a system of optical components defining the respective transmission and reception paths, certain of these optical components being developed for orienting the laser beam and for receiving, in the same direction, the radiation of the external scene included in the sighting field of the sensor; a sensor rotation device; and an alignment device for making the laser beam axis coincide with that of the sighting field leading to the centre of the swept image on the sensor, said device comprising a point light source, an optical system for focusing the radiation of the source on the sensor via a mirror interposed on the reception path and which interrupts the reception of the radiation of the scene towards the sensor during the alignment phase, and electronic means for processing the error signals at X and Y and producing sweep correction signals intended for the sensor for displacing the centre of the image, said electronic means comprising means for controlling the rotation device for producing a plurality of predetermined successive angular positions, means for storing successive error data on the image point of the source and means for calculating on the basis of the stored data errors of the invariable point of the image corresponding to the sensor rotation axis, said errors defining the sweep correction signals at X and Y to be applied to the sensor.

2. A system according to claim 1, wherein the rotation device is controlled so as to produce successive positions at 180° from one another and to this end incorporates a position sensing means.

3. A system according to claim 2, wherein the electronic means comprise a computer of the microprocessor type, which groups the storage and calculating means and which processes the drive device control signal and a source supply control signal.

4. A system according to claim 3, wherein the mirror interposed on the reception path during the alignment phase conprises a collapsible mirror which reflects the radiation from the source to the sensor during alignment, the position of this mirror being controlled by an associated device on receiving a control signal from the computer.

5. A system according to claim 4, wherein ancillary mode control means produce a signal for starting the alignment phase intended for the computer, which also receives from the tracker error signals with respect to the image point of the light source and from the sensing means data on the angular position of the sensor, said computer providing the supply signal from the source to a continuous supply circuit, the positioning signal from the collapsible mirror to the associated control device, the rotation signal from the sensor to the corresponding drive device and the calculated error values from the invariable point to a conversion circuit, which provides analog sweep correction values to the video image sensor.

6. A system according to any of claims 1 to 3, wherein one of the optical components of the reception path is a semi-transparent mirror constituting the mirror interposed in the reception path and ensuring, by transmission, the reception of the radiation from the source during alignment, the external radiation being interrupted by an angular displacement of optical orientation components.

* * * * *